Sept. 30, 1958   D. J. DE MICHELE   2,853,764
METHOD OF MAKING RESISTANCE STRAIN GAGE
Filed May 28, 1954
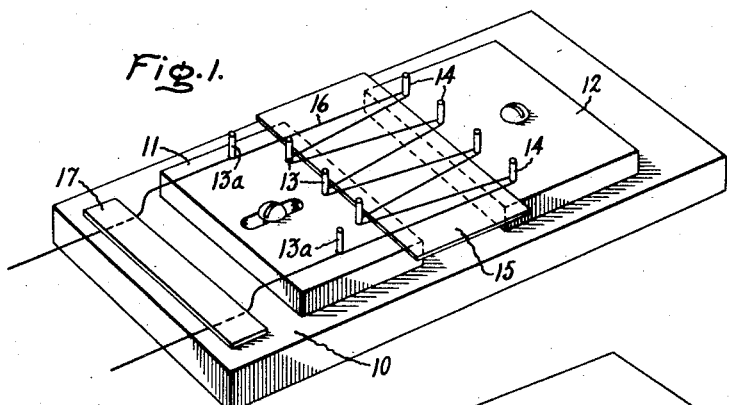
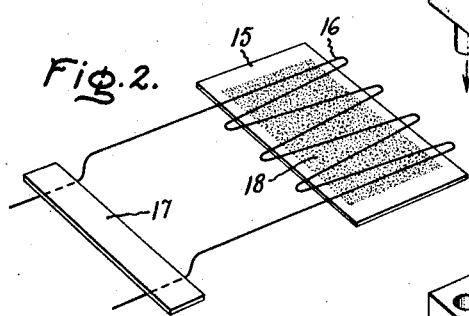
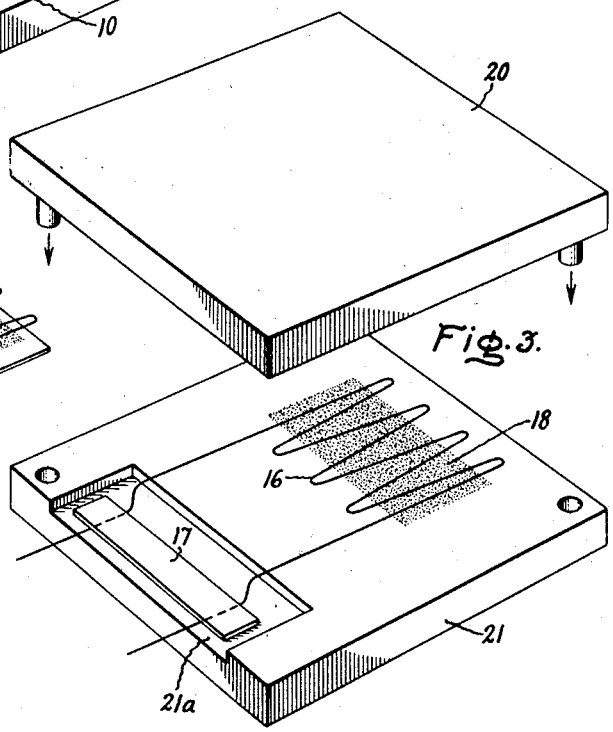
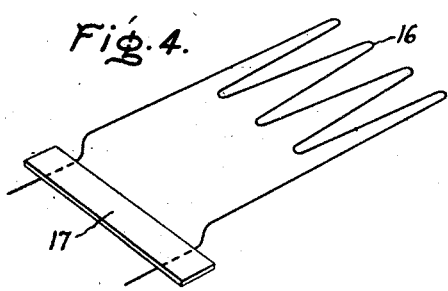
Inventor:
Dominick J. DeMichele,
by Merton D. Moore
His Attorney.

United States Patent Office 2,853,764
Patented Sept. 30, 1958

2,853,764

METHOD OF MAKING RESISTANCE STRAIN GAGE

Dominick J. De Michele, Schenectady, N. Y., assignor to General Electric Company, a corporation of New York Application May 28, 1954, Serial No. 433,240

6 Claims. (Cl. 29—155.5)

This invention relates to resistance type electric strain gages, and in particular to an improved method of making a gage of this type that is suitable for use at high temperatures.

Resistance type electric strain gages are well-known in the art and generally comprise an electrically conductive filament that is cemented to the structure subject to strain. The strain produces an elongation or a compression of the filament and thus changes its electrical resistance. In general, resistance type strain gages known today comprise either a filament permanently bonded to a support member such as a sheet of paper, which remains a part of the gage after it is attached to the structure subject to strain, or a filament imbedded in a block of bonding cement, with the entire block cemented to the structure subject to strain.

An object of this invention is to provide an improved method of making resistance type electric strain gages which are especially suitable for high temperature work in that the supporting member on which the gage may be initially formed and any bonding cement applied thereto is removed from the gage prior to its attachment to the structure subject to strain.

Another object of the invention is to provide an improved method of making such gages that does not include the use of a block of bonding cement, and thus results in a gage that is more easily bonded to the structure subject to strain than are presently used types.

The improved method of the invention comprises forming an electrically conductive filament across the face of a supporting material and applying cement thereto to hold the filament in place. After the cement is sufficiently dry or set to permit handling, the supporting material is separated from the cement and the filament partially imbedded in the cement. Pressure is then applied to the filament and the cement in which it is partially embedded in order to set the shape of the filament, after which the cement is removed from the filament. Thus, a resistance type electric strain gage made in accordance with the method of the invention comprises a wire filament that has associated therewith no supporting plate and no cement, and is suitable to be attached directly to the structure subject to strain.

Further objects and advantages of the invention will become apparent from the following description, taken in conjunction with the accompanying drawing, in which:

Fig. 1 is a perspective view of a jig useful in forming the filament;

Fig. 2 is a perspective view of the unfinished gage after it is removed from the jig;

Fig. 3 is a perspective view showing the method of setting the shape of the filament; and Fig. 4 is a perspective view of the finished gage.

Referring now to the drawing, Fig. 1 illustrates the formation of the filament of a strain gage by the use of a jig of the type described in U. S. Patent 2,548,592, issued to me on April 10, 1951. Reference is made to that patent for a detailed description of the jig and the forming operation. Briefly, however, the jig comprises a base plate 10 on which are mounted two smaller plates 11 and 12, with the plate 11 being provided with a slot and screw arrangement to permit adjustment of the distance between the plates. The plates 11 and 12 are provided with rows of small vertical pins 13 and 14, respectively, along their inner edges, and the two end pins 13a on plate 11 may be set back somewhat from the other pins to facilitate the winding operation. After the gage width is determined by securing the plate 11 in position with the desired spacing between the rows of pins 13 and 14, a sheet of supporting material 15 is placed on the jig between the two rows of pins. The sheet of supporting material 15 is somewhat narrower than the distance between the pins 13 and 14 and longer than the gage length, and, in the present case, preferably possesses definite anti-sticking properties so as to be substantially non-adherent relative to the cement applied thereto. The material may conveniently be ordinary waxed paper or a thin sheet of material such as that known commercially as Teflon, among other suitable materials.

After the jig width is set and the supporting material 15 is in place, an electrically conductive filament 16 is wound and temporarily supported on the jig. One end of the filament may be wound for several turns about one of the pins 13a, to hold the end of the filament in place, and the filament is then wound about successive pins of the two rows alternately, until the other pin 13a is reached. The filament may then be wound several turns about this pin to hold it in place, after which it is pushed down against the supporting material 15, and the movable plate 11 adjusted to pull taut the filament between the rows of pins 13 and 14. The filament may be a fine, non-self-supporting high resistance wire, preferably approximately .001" in diameter, and may be made of an alloy of 85% platinum and 15% iridium or the alloys known commercially as "Nichrome V" (20% chromium and 80% nickel) and "Karma" (essentially, 20% chromium, 73% nickel and minor amounts of aluminum and iron). Various other metals are suitable for this use, and the three alloys mentioned above are given as merely illustrative.

It is pointed out that the operation thus far described differs from that described in my above-mentioned patent in that, in the method of the present invention, the filament is wound across the face of a sheet of antisticking material such as waxed material or Teflon, while in the method described in my patent, the filament is wound across the face of a sheet of mica. Although it is possible to construct a strain gage in accordance with the method of the present invention by using a mica supporting material, the waxed material or a material such as Teflon are preferred because of their superior anti-sticking properties.

After the filament 16 is wound across the face of the supporting material 15 and pushed down thereagainst, a thin layer of bonding cement is applied to the face of the supporting material with sufficient thickness to cover partially the portions of the filament extending thereacross. Of course, the bonding cement should not extend over the edges of the supporting material. The bonding cement preferably comprises a conventional acetate cement, such as is well-known in the art and is available commercially from a number of sources, although the invention is not limited to the use of any particular type of cement.

After the cement is dried, which in the case of an acetate cement may be accomplished by merely exposing the cement to air, the ends of the filament may be unwound from the pins 13a and a tab 17 cemented across them. The tension may then be released from the jig, and the gage lifted therefrom. As illustrated in Fig. 2, the unfinished strain gage now comprises a supporting material 15, a layer of cement 18 coated thereon with the filament partially imbedded in the cement, and the tab 17 secured across the ends of the filament wire. At this time, the supporting material 15 may be separated from the dried layer of cement and the filament retained thereby. In the case where the anti-sticking supporting material is in the form of a thin sheet, the material may be easily peeled from the remainder of the gage structure.

The relatively thin sheet of dried acetate cement with the gage filament partially imbedded therein is then placed in a press (shown diagrammatically in Fig. 3) comprising a pair of parallel polished steel plates 20 and 21 adapted to move toward each other and exert pressure on an object placed between them. One of the steel plates, for example, the plate 21, may be provided with a recess 21a to accommodate the tab 17 placed across the ends of the filament 16. The press, which may be of the conventional hydraulic type that is well-known in the art, is then actuated to apply pressure to the gage structure to flatten the filament and cause it to retain its shape. The pressure required to set the shape of the filament may vary according to the composition of the wire comprising the filament, However, it has been found that the operation may be satisfactorily accomplished by flattening the filament until its thickness is approximately one-half the original diameter of the wire.

The final step in the formation of a high temperature strain gage in accordance with the method of the invention consists of removing the cement 18 from the filament of the gage. In the case of acetate cement, this may be accomplished by immersing the filament and cement in a thinner for the cement to dissolve the cement from the gage structure. Preferably, the tab 17 is left on the gage to provide convenient means for handling the gage until it is ready for use, at which time the cement holding the tab in place may be removed or the ends of the filament and the tab may be cut off.

When the gage is to be used upon a structure subject to strain, the surface to which the gage is to be attached should be sand-blasted or sand-papered and thoroughly cleaned with denatured alcohol. An undercoating of nonconductive cement is then applied to the clean surface with a thickness of .001–.003 inch. Various cements are suitable for this use, among them being Allen P-1 cement manufactured by Allen Cement Company, Mechanicville, New York, 47–3B and 71B cement (or a combination of 47–3B and 71B cement) manufactured by the General Electric Company. The cement undercoat should be allowed to air dry and then cured for approximately 30 minutes at about 200° C. After the undercoat is cured, the strain gage is placed over the cement and enough additional cement is applied to cover the wire of the strain gage. The cement is again allowed to air dry and is cured for approximately one hour at about 200° C. It is recommended that the temperature be cycled in order to remove any hysteresis effect that the cement might have.

It is now apparent that the invention provides an improved method of making resistance type strain gages that has various advantages over the methods heretofore known. Because a gage made in accordance with the method of the invention is not bonded in a mass of cement prior to its application to the surface subject to strain, the thickness of the cement surrounding the gage may be held to a minimum and the bonding of the gage to the surface improved, thereby improving the performance of the gage. Furthermore, resistance type electric strain gages constructed in accordance with the teachings of the invention may be used at temperatures ranging from room temperature up to approximately 2,000° F., the range being determined only by limitations inherent in the filament or in the cement used to apply the filament to the structure subject to strain.

What I claim as new and desire to secure by Letters Patent of the United States is:

1. The method of making self-supporting electric strain gages, which comprises forming a substantially non-self-supporting electrically conductive filament into a single layer which is temporarily supported in the desired shape, applying a thin layer of bonding cement to said filament for temporarily retaining the filament in the desired shape, separating said temporarily retained filament from the temporary support, applying sufficient pressure to the filament thus formed and retained to flatten and set the shape thereof, and removing the remaining bonding cement from the filament.

2. The method of making self-supporting resistance type electric strain gages, which comprises forming and temporarily supporting an electrically conductive substantially non-self-supporting filament across the face of a supporting material in a single layer, said supporting material underlying portions of said filament, applying a layer of bonding cement to the face of said material and the filament lying thereon, said supporting material being substantially non-adherent relative to said bonding layer, drying the cement to temporarily retain and permit handling thereof, separating the temporary support from the cement and the filament retained thereby, applying pressure to the cement and the filament retained thereby to flatten and set the shape of the filament, and removing the remaining cement from the filament.

3. A method of making self-supporting single layer resistance type electric strain gages, which comprises forming and temporarily supporting an electrically conductive substantially non-self-supporting filament across the face of supporting material, applying a bonding layer to the filaments to embed portions thereof which when set temporarily retains and permits handling thereof, said supporting material being substantially non-adherent relative to said bonding layer, separating the supporting material from the bonding layer and filament retained thereby, applying pressure to the bonding layer and the filament temporarily retained thereby to flatten and to set the shape of the filament, and dissolving the remaining cement from the filament.

4. The method of making self-supporting resistance type electric strain gages, which comprises placing a supporting material between two rows of pins on a winding jig, winding a single layer electrically conductive substantially non-self-supporting filament around successive pins on opposite sides of the supporting material alternately for temporary support so that the filament extends back and forth across the face of the supporting material, applying a thin layer of bonding cement to the face of said material and the filament lying thereon, drying the cement to temporarily retain and permit handling thereof, separating the temporary support from the cement and the filament retained thereby, applying pressure to the cement and the filament retained thereby to flatten and set the shape of the filament, and removing the remaining cement from the filament.

5. The method of making self-supporting single layer resistance type electric strain gages, which comprises placing supporting material between two rows of pins on a winding jig, winding an electrically conductive substantially non-self-supporting filament around successive pins on opposite sides of the supporting material alternately so that the filament extends back and forth across the face of the supporting material, applying an acetate cement layer upon the face of the supporting material to partially cover and temporarily retain the filament lying thereon, said supporting material being substantially non-adherent relative to said acetate layer, drying the cement to permit handling of the filament retained thereby, separating the supporting material and the pins from the cement and the filament retained thereby, applying sufficient pressure to the cement and the filament retained thereby to flatten the filament to approximately one-half its original thickness and to set the shape thereof, and dissolving the remaining acetate cement from the filament.

6. The method of making self-supporting resistance type electric strain gages, which comprises winding a substantially non-self-supporting electrically conductive filament around successive rows of pins on a winding jig on opposite sides of a supporting material so that a single layer filament extends back and forth and is temporarily supported across the face of the supporting material, applying a layer of bonding material upon the face of the supporting material to partially cover and temporarily retain when set the filament lying thereon, said supporting material being substantially non-adherent relative to said bonding layer, separating said temporarily retained filament from the temporary support, applying sufficient pressure to the filament and the associated bonding layer to flatten and set the shape of the filament, and removing the remaining bonding material from the filament.

References Cited in the file of this patent

UNITED STATES PATENTS

| | | |
|---|---|---|
| 2,208,052 | Pierce | July 16, 1940 |
| 2,393,714 | Simmons | Jan. 29, 1946 |
| 2,434,628 | Simmons | Jan. 13, 1948 |
| 2,548,592 | De Michele | Apr. 10, 1951 |